(12) United States Patent
Arnold et al.

(10) Patent No.: US 6,330,821 B1
(45) Date of Patent: Dec. 18, 2001

(54) METHOD OF DETECTING EXPANSION VESSEL LEAKAGE

(75) Inventors: William Allen Arnold, Coventry; Joseph Alan Incavo, Green, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/503,029

(22) Filed: Feb. 14, 2000

(51) Int. Cl.[7] .............................. G01M 3/04; G01M 3/26; B29C 35/04
(52) U.S. Cl. ........................... 73/40; 73/40.7; 73/49
(58) Field of Search ........................ 73/40, 40.7, 49, 73/49.8

(56) References Cited

U.S. PATENT DOCUMENTS

| 3,175,390 | * | 3/1965 | McConkie | 73/49 |
|---|---|---|---|---|
| 3,721,117 | * | 3/1973 | Ford et al. | 73/40.7 |
| 3,942,922 | | 3/1976 | Cole et al. | 425/30 |
| 4,188,818 | | 2/1980 | Garrison | 73/40.7 |
| 4,221,124 | | 9/1980 | Jones | 73/40 |
| 4,754,638 | * | 7/1988 | Brayman et al. | 73/40.7 |
| 4,785,666 | | 11/1988 | Bergquist | 73/40.7 |
| 4,791,805 | * | 12/1988 | Gates | 73/40.7 |
| 4,862,731 | * | 9/1989 | Gates | 73/40.7 |
| 4,893,497 | | 1/1990 | Danielson | 73/40.7 |
| 4,920,785 | * | 5/1990 | Etess | 73/40.7 |
| 5,172,583 | * | 12/1992 | Tallon | 73/40.7 |
| 5,417,900 | | 5/1995 | Martin, Sr. | 264/40.5 |
| 5,618,991 | * | 4/1997 | Levinrad | 73/40.7 |

* cited by examiner

Primary Examiner—Hezron Williams
Assistant Examiner—David J. Wiggins
(74) Attorney, Agent, or Firm—David E Wheeler

(57) ABSTRACT

A method for detecting leakage of an expansion vessel 14 that, in an inflated form, occupies or has occupied at least a portion of a cavity 24 of an elastomeric article. The method includes the step of adding a tracer gas to a pressurized fluid. The method is characterized by the step of examining the atmosphere within the cavity of the elastomeric article, not within the expansion vessel, for evidence indicating that a portion of the tracer gas has escaped from the expansion vessel.

3 Claims, 3 Drawing Sheets

METHOD OF DETECTING EXPANSION VESSEL LEAKAGE

TECHNICAL FIELD

This invention relates to a method for inspecting for evidence of leakage of an expansion vessel, and more particularly, to a method for inspecting for evidence of a pinhole leak in an expansion vessel.

BACKGROUND ART

Many curing devices for molded products use an expansion vessel, also known as a curing bladder. In a curing device, most expansion vessels are pressurized with a fluid heat source, such as steam. The fluid heat source causes the expansion vessel to expand, pushing the product tightly against the mold. Further, the heat from the fluid heat source helps to at least partially cure the molded product.

Problems occur when a defect, such as a pinhole leak, forms in the expansion vessel. In the tire industry, pinhole leaks in expansion vessels on curing devices are one of the industry's largest causes of tire scrap. Pinhole leaks hi expansion vessels cost tire manufacturers millions of dollars per year. A pinhole leak allows high temperature steam to contact the innerliner of the tire. One possible result from this contact is an undercured area in the innerliner. Another possible result is the permeation of steam into the ply area of the tire causing a blister that can result in the separation of the plies. Currently, the first inspection of a tire for the effects of pinhole leaks occurs in the final finish area of the tire plant, minutes after the tire leaves the curing device. If a tire in final finish is found to be defective as a result of a pinhole leak, then up to ten additional tires may have been cured with the same defective expansion vessel prior to discovery of the problem. Generally, all of these tires must be scrapped.

In order to reduce scrap caused by defective expansion vessels, the expansion vessels are changed after a set number of cycles. However, this preventative measure does not always prevent scrap because a pinhole leak may develop prior to this set number of cycles. Additionally, this preventive measure may change out some expansion vessels that still have many more cycles in their effective life. Thus, scrap tires may still result, money is lost by not utilizing the full life of the expansion vessel, and additional labor (costs arise due to more frequent expansion vessel changes.

Curing device manufacturers have attempted to limit scrap products caused by pinhole leaks in expansion vessels by incorporating a monitoring system into the curing device. Before a product to be cured is placed into the curing device, the expansion vessel of the curing device is pressurized. The pressurized expansion vessel is isolated by closing the valves in the supply and discharge lines. The monitoring system monitors the pressure in the expansion vessel to determine if a leak is present U.S. Pat. No. 5,417,900 entitled "VACUUM LEAK DETECTOR FOR A TIRE CURING PRESS" discloses a device and a method for detecting a leak in an inflatable elastomeric bladder of a curing press. The spent curing fluid is pumped through an exhaust line in which a venturi ejector is located. The venturi ejector causes a vacuum to be created as the fluid is being removed. A vacuum sensor monitors this vacuum. If a predetermined vacuum strength is not reached in a predetermined time, a leak is assumed to exist.

These prior art systems work well when a leak occurs at the coupling attaching the expansion vessel to the curing device. However, these systems are not adequate for detecting a pinhole leak in an expansion vessel. Since the quantity of fluid lost through a pinhole leak is small, relative to a coupling leak, determining the presence of such a leak using pressure and/or vacuum sensors is very difficult. These devices are also ineffective because they can also signal leaks in bladder seals, thus producing false positive responses.

SUMMARY OF THE INVENTION

This invention provides a method for detecting leakage of an expansion vessel that, in an inflated form, occupies or has occupied at least a portion of a cavity of an elastomeric article. The method includes the step of: adding a tracer gas to a pressurized fluid The pressurized fluid is used to inflate the expansion vessel. The tracer gas is added prior to the expansion vessel's withdrawal from the cavity of the elastomeric article.

The method is characterized by the step of examining the atmosphere within the cavity of the elastomeric article, and not within the expansion vessel, for evidence indicating that a portion of the tracer gas has escaped from the expansion vessel.

DEFINITIONS

For ease of understanding this disclosure, the following terms are defined.

"Bead" means that part of the tire comprising an annular tensile member wrapped by ply cords and shaped, with or without other reinforcement elements such as flippers, chippers, apexes, toe guards, and chafers, to fit a design rim. The beads are associated with holding the tire to the wheel rim.

"Curing" means the process of heating or otherwise treating a rubber or plastic compound to convert it from a thermoplastic or fluid material into a solid, relatively heat-resistant state by causing cross-linking of the compound. When heating is employed, the process is called vulcanization.

"Elastomer" means a resilient material capable of recovering size and shape after deformation.

"Elastomeric article" is an article that is at least partially made from an elastomer.

"Innerliner" means the layer or layers of elastomer or other material that form the inside surface of a tubeless tire and that contain the inflating fluid within the tire.

"Pneumatic tire" means a laminated Mechanical device of generally toroidal shape, usually an open torus, having beads and a tread and made of rubber, chemicals, fabric and steel or other materials. When mounted on the wheel of a motor vehicle, the tire, through its tread, provides traction and contains the fluid that sustains the vehicle load.

"Radial" and "radially" are used to mean directions toward or away from the axis of rotation of the tire.

BRIEF DESCRIPTION OF DRAWINGS

The invention will be described by way of example and with reference to the accompanying drawings in which.

DETAILED DESCRIPTION OF THE INVENTION

Figure 1:
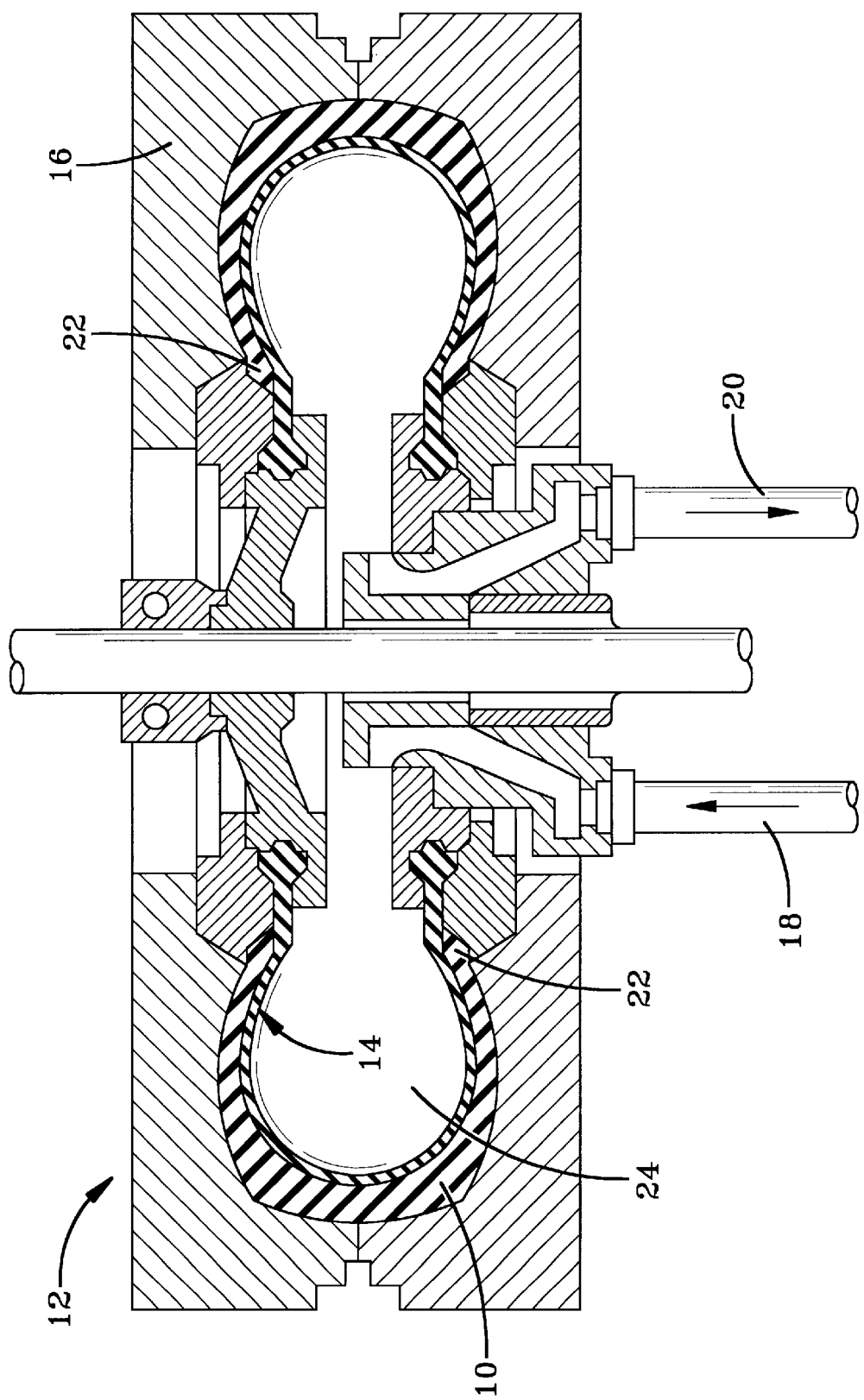
FIG. 1 is a view of an elastomeric article in a curing device with an expansion vessel.

FIG. 1 illustrates an elastomeric article, in this instance a tire 10, in a curing device 12.

The curing device 12 has an expansion vessel 14 that inflates when a pressurized fluid is introduced into its interior. FIG. 1 shows the expansion vessel in its inflated form. In a typical curing device 12, the inflated expansion vessel 14 forces the elastomeric article tightly against a mold 16. While the pressurized expansion vessel 14 holds the elastomeric article against the mold 16, the elastomeric article is heated to cause curing. The heat may be introduced via the mold 16 or via the pressurized fluid. Typically, steam is used as both a pressurized fluid and a heat source for at least a portion of the cure time.

The mold 16 illustrated in FIG. 1 is a two piece mold that separates for the removal of a cured elastomeric article, and insertion of an uncured elastomeric article. The pressurized fluid is introduced into the expansion vessel 14 through an inlet channel 18, and it exits through an exit channel 20. The inlet channel 18 and the exit channel 20 contain valves which work together to regulate the pressure within the expansion vessel 14.

In the curing of a tire 10, an uncured tire 10 is placed into a curing device 12 having an expansion vessel 14. The uninflated expansion vessel 14 is located radially inwardly of the beads 22 of the tire 10. After the mold 16 is closed, a pressurized fluid, usually steam, is introduced into the expansion vessel 14 and the expansion vessel 14 inflates. As the expansion vessel 14 inflates, at least a portion of it enters into a cavity 24 in the tire 10. Ideally, the expansion vessel 14 will occupy the entire cavity 24 and contact the surface within the cavity 24, pushing the tire 10 against the mold 16. Generally, the surface within the cavity 24 that is contacted by the expansion vessel 14 is the innerliner of the tire 10. The pressurized fluid is contained within the expansion vessel 14 for a predetermined period of time so that the tire 10 may at least partially cure. In most instances, the heat source is removed prior to deflating the expansion vessel 14. When steam is used and this is done, the steam, which acts as the heat source and the pressurized fluid, is slowly released out of the expansion vessel 14 and is replaced by another pressurized fluid, such as nitrogen. After a predetermined time has elapsed, the pressurized fluid is released from the expansion vessel 14 into the exit channel 20. As a result, the expansion vessel 14 is deflated and is withdrawn from the cavity 24. Finally, the mold 16 is opened and the at least partially cured tire 10 is removed from the curing device.

In the method of the invention, a tracer gas is added to a pressurized fluid used to inflate the expansion vessel 14. The expansion vessel 14, in its inflated form, occupies at least a portion of the cavity 24 of an elastomeric article. A tracer gas is added prior to the expansion vessel's withdrawal from the cavity 24 of the elastomeric article. The tracer gas can be helium, carbon dioxide or a similar gas whose presence can be detected in a closed atmosphere. When the tracer gas is added, the pressure within the expansion vessel 14 can either be maintained or be changed. If no pressurized fluid is released through the exit channel 20 when the tracer gas is added, the pressure within the vessel will increase. If some pressurized fluid is bled out of the expansion vessel 14 while the tracer gas is being added, the pressure can be maintained or changed depending upon the amount of pressurized fluid released. After withdrawal of expansion vessel 14 from cavity 24, the atmosphere of the cavity 24 of the elastomeric article is examined for evidence indicating that a portion of the tracer gas has escaped from the expansion vessel 14.

As, those skilled in the art will realize, some tracer gases, such as helium, may saturate a rubber expansion vessel 24 if the tracer gas is in contact with expansion vessel 24 for long periods of time. Depending upon the tracer gas used, the exposure time of the tracer gas to the expansion vessel may be limited to a time less than the saturation time. The examination of the atmosphere of the cavity 24 of the elastomeric article may take place either while the expansion vessel 14 still occupies a portion of the cavity 24 or after the expansion vessel 14 is withdrawn from the cavity 24. Thus, this examination may occur while the elastomeric article is in the curing device 12 or after the article has been removed from the curing device 12. If the examination takes place while a portion of the expansion vessel 14 still occupies part of the cavity 24, the expansion vessel 14 may restrict the outflow of the tracer gas from the cavity 24 making detection of the tracer gas more likely. If the expansion vessel 14 still occupies a portion of the cavity 24, the examination is limited to the atmosphere of the cavity 24 and does not include any space within the expansion vessel 14.

Figure 2:
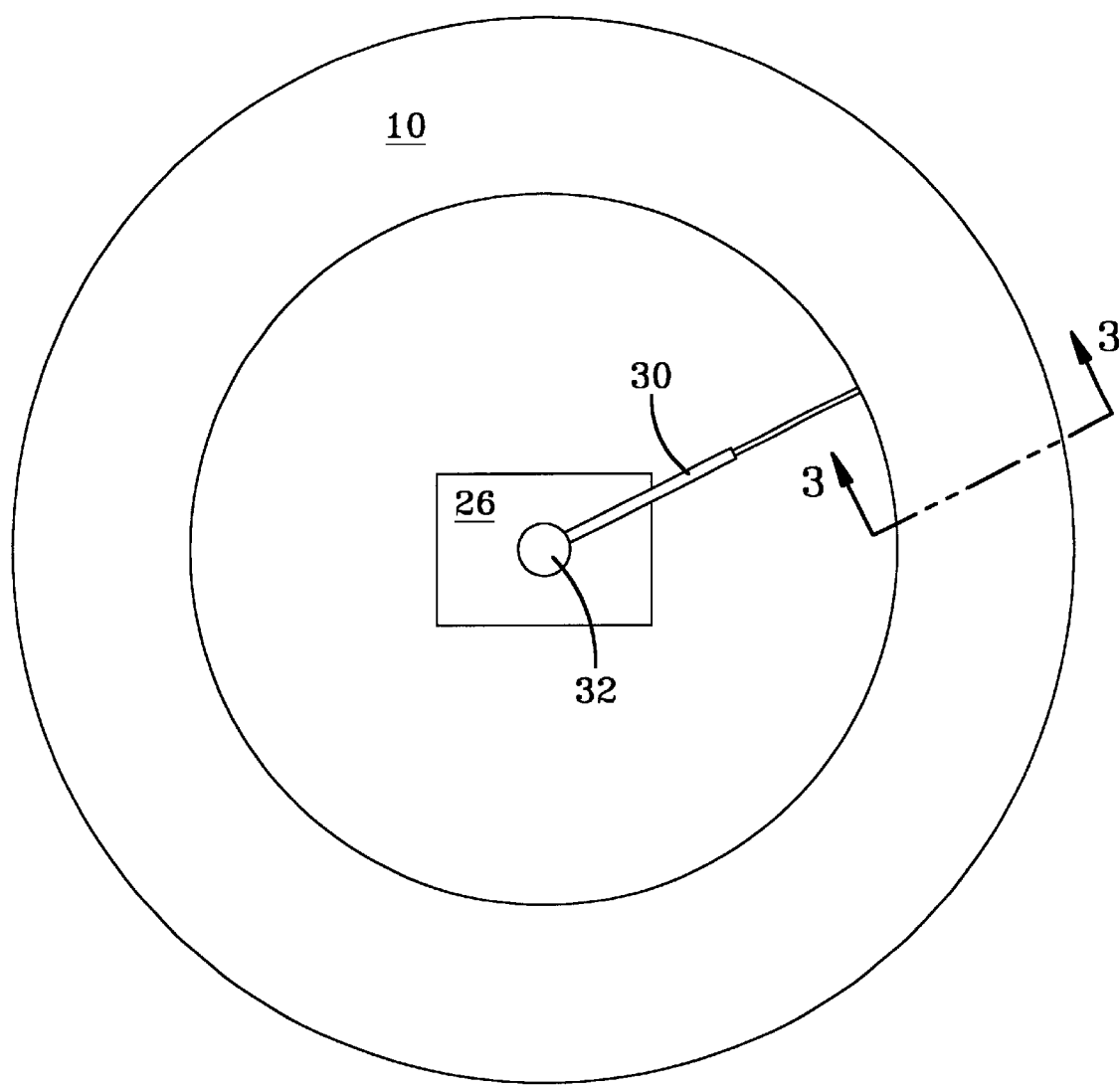
FIG. 2 is a view of an apparatus that can be used to examine the atmosphere within a cavity in the elastomeric article.
Figure 3:
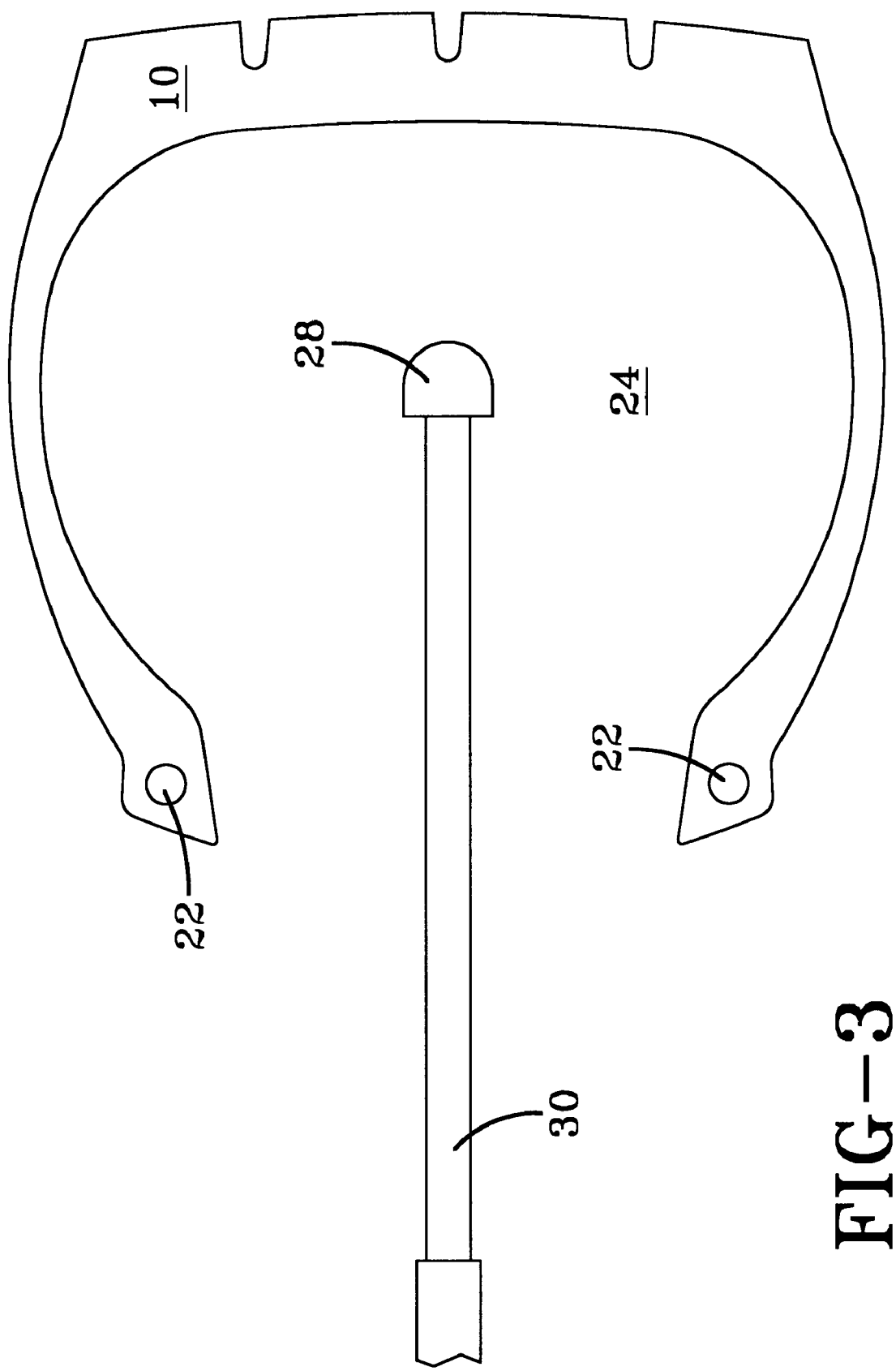
FIG. 3 is a cross-sectional view taken alone line 3—3 in FIG. 2.

FIG. 2 illustrates an apparatus that may be used to examine the cavity of the elastomeric article and FIG. 3 illustrates a cross-section of the apparatus during inspection of an elastomeric article having a cavity 24. As illustrated, an elastomeric article, shown as a tire 10, is placed over an examining device 26. The examining device 26 may be a mass spectrometer, a thermal conductivity detector, a carbon dioxide detector, a Geiger counter, or any other device that could detect the presence of the tracer gas used. The examining device 26 has a probe 28 that extends from the examining device 26 on a telescopic tube 30. After the elastomeric article is properly placed, the telescopic tube 30 extends the probe 28 into the cavity 24 of the elastomeric article so that the atmosphere of the cavity 24 can be examined. The telescopic tube 30 extends from a turret 32 mounted on the examining device 26. The turret 32 allows the probe 28 to be moved throughout a substantial portion of the atmosphere of the cavity 24. While at least part of the examining device 26, in this instance the probe 28, is moved through the cavity, the examining device 26 senses the presence of the tracer gas. If the expansion vessel 14 has a leak, evidence of the tracer gas will likely be found in the atmosphere of the cavity 24 of the elastomeric article because the pressurized fluid in the expansion vessel, when inflated, will force some of the tracer gas through the leak and into the cavity 24.

In the preferred method, the amount of tracer gas in the elastomeric article is determined and this amount is compared to the amount of tracer gas found in an atmosphere of a cavity of a control article. The control article is an elastomeric article of which at least a portion of its cavity was occupied by a known, non-defective expansion vessel, in its inflated form. By testing the control article, a base line for the tracer gas is determined. A base amount of tracer gas only needs to be determined if the tracer gas is a gas normally found in air, such as helium or carbon dioxide.

The examining device 26 shown in FIG. 2 may be interconnected with the curing device 12, shown in FIG. 1, so that the curing device 12 can be stopped as soon as evidence of escaped tracer gas is discovered. Thus, if it is found that there is a greater amount of tracer gas in the atmosphere of the cavity 24 of the elastomeric article than in the atmosphere of the cavity of the control article, the curing device 12 will be stopped.

Table 1 and Table 2 show experimental data collected by following the method of the invention. For each experiment, pinhole leaks were deliberately created with a ⅛ inch (3.175 mm) awl near the mid-height of the expansion vessel 14. Where two holes were present, the holes were located a few inches apart on an unexpanded expansion vessel 14. In each experiment, the elastomeric article was a P205/75R14 tire.

It is theorized that the tracer gas is absorbed by the innerliner of the tire 10. When the pressure is released, the tracer gas begins to desorb from the innerliner and becomes trapped within the cavity 24 of the tire 10.

Table 1 illustrates the results of an experiment using helium as the tracer gas. The standard cure time for the tires used in the experiment is 174 seconds of steam at 200 psi (1,380 kPa) followed by 360 seconds of nitrogen at 300 psi (2,069 kPa). The helium was introduced for the last 60 seconds of the cure time. Near the 300 second mark of the nitrogen phase of the cure, the nitrogen pressure was reduced to 200 psi (1,380 kPa) and then helium was added to raise the pressure within the expansion vessel 14 to between 250 and 300 psi (1,724 and 2,069 kPa). The atmosphere of each cavity 24 was examined for evidence of helium within two minutes of removal from the curing device 12. The two examining devices 26 used were a mass spectrometer, which measured the presence of the helium in standard cubic centimeters per second, and a thermal conductivity detector, which measured the presence of helium in parts per million. As shown in Table 1, the amount of helium present in the cavity 24 increased dramatically when a pinhole was present in the expansion vessel 14.

TABLE 1

| Bladder Condition | Nitrogen Pressure after bleeding (psi) | Line Pressure after Helium added (psi) | Mass Spec. reading inside tire (std cc/s) | Thermal Cond. reading inside tire (ppm) |
|---|---|---|---|---|
| No Holes | 200 | 250 | $1 \times 10^{-8}$ | <1 |
| One Pinhole | 200 | 280 | $8 \times 10^{-7}$ at pinhole location | 5 at pinhole location |
| Two Pinholes | 200 | 250 | $1 \times 10^{-6}$ at pinhole location | >7 (offscale) at pinhole location |

Table 2 shows the results of an experiment using carbon dioxide as the tracer gas. In this experiment, the same procedures described in the first experiment were used. The examining device 26 used was a carbon dioxide detector that was zeroed on the ambient air and measured the presence of carbon dioxide in parts per million. Using this procedure, no carbon dioxide was found in an expansion vessel 14 having two pinholes.

The procedure was modified, and immediately following the application of 174 seconds of 200 psi (1,380 kPa) steam, the carbon dioxide was added until the pressure within the expansion vessel 14 reached 300 psi (2,069 kPa). The 300 psi (2,069 kPa) was maintained over 360 seconds by adding nitrogen. The atmosphere of each cavity 24 was examined for evidence of carbon dioxide within two minutes of removal of the tire 10 from the curing device 12. As shown in Table 2, the amount of carbon dioxide present in the cavity 24 increased dramatically when a pinhole was present in the expansion vessel 14.

TABLE 2

| Bladder Condition | Line Pressure with $CO_2$ (psi) | $CO_2$ Infrared Detector Reading (ppm) |
|---|---|---|
| No Holes | 300 | 0 (zeroed on ambient air) |
| One Pinhole | 300 | • 400 at pinhole location<br>• 250–300 away from pinhole |

This invention allows for detection of a defect in an expansion vessel immediately after each cycle of the curing device. The invention will limit the number of scrap products caused by a pinhole leak to one molded product per defective expansion vessel, and will allow each expansion vessel to be used until a defect occurs Thus, this invention will reduce the number of scrap products and the costs associated with changing expansion vessels prior to the end of their effective life.

What is claimed is:

1. A method for detecting leakage of an expansion vessel (14), the expansion vessel in an inflated form occupying or having occupied at least a portion of a cavity of an elastomeric article, the method including the step of (i) adding a tracer gas to a pressurized fluid, the pressurized fluid being used to inflate the expansion vessel against an atmosphere enclosed by said article cavity (14), the tracer gas being added prior to the expansion vessel's (14) withdrawal from the cavity, the method being characterized by the step of (ii) examining the atmosphere within the cavity (24) of the elastomeric article, but not within the expansion vessel (14), for evidence indicating that a portion of the tracer gas has escaped from the expansion vessel (14).

2. A method of claim 1, the step of examining the atmosphere within the cavity (24) of an elastomeric article for evidence indicating a portion of the tracer gas has escaped from the expansion vessel (14) being further characterized by the steps of (i) moving at least part of an examining device (26) throughout a substantial portion of the atmosphere of the cavity (24), and (ii) sensing for the presence of the tracer gas.

3. A method of claim 1, the step of examining the atmosphere within the cavity (24) of an elastomeric article for evidence indicating a portion of the tracer gas escaped from the expansion vessel (14) being further characterized by the steps of (i) determining an amount of the tracer gas present in the atmosphere of the cavity of the elastomeric article, and (ii) comparing the amount of the tracer gas found to an amount of the tracer gas present in an atmosphere of a cavity of a control article, a known non-defective expansion vessel in an inflated form having occupied at least a portion of the cavity of the control article.

* * * * *